United States Patent
Kroupenkine et al.

(10) Patent No.: US 6,538,823 B2
(45) Date of Patent: Mar. 25, 2003

(54) TUNABLE LIQUID MICROLENS

(75) Inventors: Timofei N. Kroupenkine, Picataway, NJ (US); Shu Yang, North Plainfield, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/884,605

(22) Filed: Jun. 19, 2001

(65) Prior Publication Data

US 2002/0196558 A1 Dec. 26, 2002

(51) Int. Cl.[7] .......................... G02B 01/06; G02B 03/12
(52) U.S. Cl. ...................................... 359/665
(58) Field of Search ................. 359/620, 665, 359/666, 245

(56) References Cited

U.S. PATENT DOCUMENTS

| | | | | |
|---|---|---|---|---|
| 3,670,130 A | | 6/1972 | Greedwood | 200/183 |
| 4,030,813 A | * | 6/1977 | Kohashi et al. | 359/245 |
| 4,118,270 A | | 10/1978 | Pan et al. | 156/659 |
| 4,137,060 A | | 1/1979 | Timmerman | 65/31 |
| 4,338,352 A | | 7/1982 | Bear et al. | 427/8 |
| 4,406,732 A | | 9/1983 | Kayoun | 156/626 |
| 4,569,575 A | | 2/1986 | Le Pesant et al. | 359/245 |
| 4,653,847 A | | 3/1987 | Berg et al. | 385/79 |
| 4,671,609 A | | 6/1987 | Khoe et al. | 385/33 |
| 4,708,426 A | | 11/1987 | Khoe | 385/43 |
| 4,867,521 A | | 9/1989 | Mallinson | 385/34 |
| 4,948,214 A | | 8/1990 | Hamblem | 359/654 |
| 5,412,746 A | | 5/1995 | Rossberg et al. | 385/48 |
| 5,486,337 A | | 1/1996 | Ohkawa | 422/100 |
| 5,518,863 A | | 5/1996 | Pawluczyk | 430/321 |
| 5,659,330 A | | 8/1997 | Sheridon | 345/84 |
| 6,014,259 A | | 1/2000 | Wohlstadter | 359/619 |
| 6,369,954 B1 | * | 4/2002 | Berge et al. | 349/200 |

FOREIGN PATENT DOCUMENTS

| | | |
|---|---|---|
| DE | 196 23 270 A | 1/1998 |
| FR | 2 769 375 A1 | 4/1999 |

OTHER PUBLICATIONS

Schilling, Andreas et al., Surface Profiles of Reflow Microlens Under the Influence of Surface Tension and Gravity, *Opt. Eng.* 39(8) pp. 2171–2176, Society of Photo–Optical Instrumentation Engineers, Aug. 2000.

Danzebrink, R. et al., "Deposition of Micropatterned Coating Using an Ink–Jet Technique,"*Thin Solid Films* 351, pp. 115–118, Elsevier Science S.A. (1999).

Feng, Chuan Liang, et al., "Reversible Wettability of Photoresponsive Flourine–Containing Azobenzene Polymer in Langmuir–Blodgett Films,"*Langmuir* vol. 17, No. 15, 2001, pp. 4593–4597, American Checmical Society, published on Web Jun. 22, 2001.

Ichimura, Kunihiro et al., "Light–Driven Motion of Liquids on a Photoresponsive Surface" *www.sciencemag.org*, Science, vol. 288, Jun. 2, 2000, pp. 1624–1626.

Commander, L.G. et al., "Variable Focal Length Microlenses," *Optics Communications* 177 (2000), Apr. 15, 2000, pp. 157–170.

Washizu, Masao, "Electrostatic Actuation of Liquid Droplets for Microreactor Applications," IEEE Transactions on Industry Applications, vol. 34, No. 4, Jul./AUg. 1998, pp. 732–737.

* cited by examiner

*Primary Examiner*—Ricky Mack
(74) *Attorney, Agent, or Firm*—Duane Morris, LLP (57) ABSTRACT

A tunable liquid microlens includes an insulating layer, a droplet of a transparent conducting liquid disposed on a first surface of the insulating layer and a plurality of electrodes insulated from the droplet by the insulating layer. The plurality of electrodes are disposed such that they may be selectively biased to create a respective voltage potential between the droplet and each of the plurality of electrodes, whereby a contact angle between the droplet and the first surface is variable and the droplet may be repositioned along the first surface.

29 Claims, 6 Drawing Sheets

TUNABLE LIQUID MICROLENS

FIELD OF THE INVENTION

The present invention relates to microlenses, and more particularly to liquid microlenses.

DESCRIPTION OF THE RELATED ART

Most tunable microlenses are either gradient index (GRIN) lenses with the refraction index controlled electrostatically or flexible polymeric lenses with the shape controlled mechanically. Both technologies have inherent limitations that impose severe restrictions on the performance of these existing tunable microlenses.

Tunable gradient index lenses have inherent limitations associated with the relatively small electro-optic coefficients found in the majority of electro-optic materials. This results in a small optical path modulation and, therefore, requires thick lenses or very high voltages to be employed. In addition, many electro-optic materials show strong birefringence that causes polarization dependence of the microlens properties.

Mechanically adjustable flexible lenses typically have a substantially wider range of tunability than the gradient index lenses. However, they require external actuation devices, such as micropumps, to operate. Microintegration of such devices involves substantial problems, especially severe in the case where a two-dimensional array of tunable microlenses is required.

Attempts have also been made to use other technologies to produce tunable microlenses, such as liquid microlenses controlled through self assembled monolayers (SAMs). Some of these attempts are described in U.S. Pat. No. 6,014,259 to Wohlstadter, issued Jan. 11, 2000, the entirety of which is hereby incorporated by reference herein. Microlenses utilizing self assembled monolayers, however, also suffer from several problems, including severe limitations on material selection and strong hysteresis leading to the failure of the microlens to return to an original shape after a tuning voltage is disconnected. Additionally, none of the above-described microlenses allow for both lens position adjustment and focal length tuning.

SUMMARY OF THE INVENTION

A tunable liquid microlens includes an insulating layer, a droplet of a transparent conducting liquid disposed on a first surface of the insulating layer and a plurality of electrodes insulated from the droplet by the insulating layer. The plurality of electrodes are disposed such that they may be selectively biased to create a respective voltage potential between the droplet and each of the plurality of electrodes, whereby a contact angle between the droplet and the first surface is variable and the droplet may be repositioned along the first surface. Note that by transparent it is meant transparent at the light frequency of interest, which may or may not be visible.

The tunable liquid microlens allows for both lens position adjustment and focal length tuning. In addition, the tunable liquid microlens provides greater freedom in material selection.

BRIEF DESCRIPTION OF THE DRAWINGS

The accompanying drawings illustrate preferred embodiments of the invention, as well as other information pertinent to the disclosure, in which.

It should be understood that the figures are included for illustrative purposes and are not drawn to scale.

DETAILED DESCRIPTION

Before the tunable liquid microlens of the present invention is described in detail, a description of a liquid microlens generally and a description of the electrowetting phenomena are first provided.

Figure 1A:
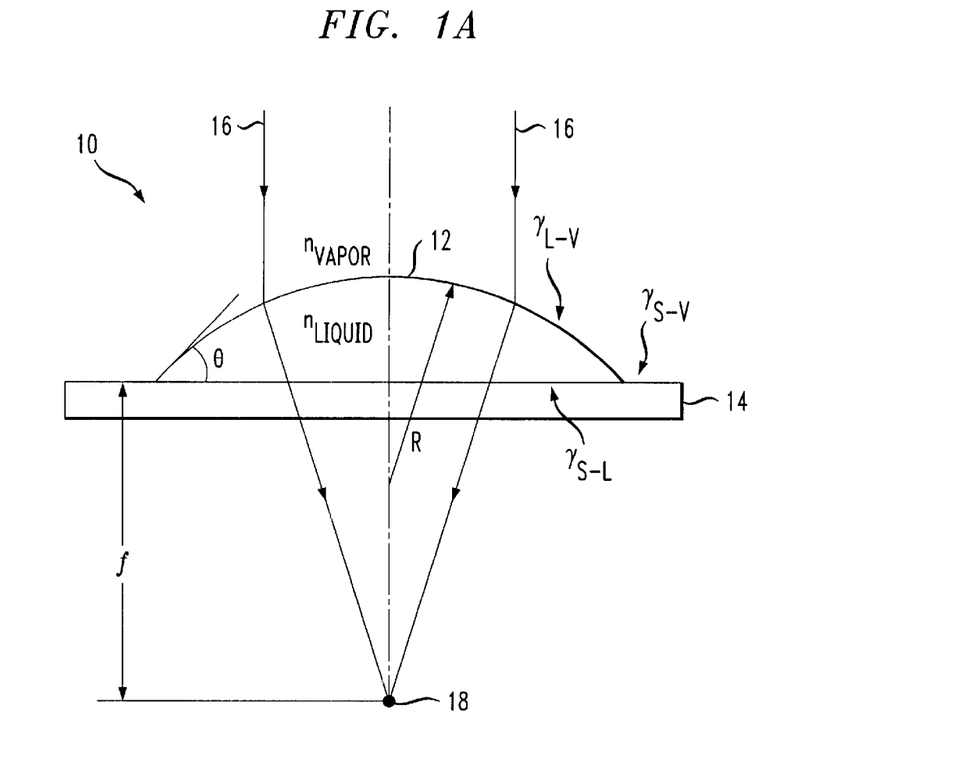
FIG. 1A is a diagrammatic representation of light waves passing through a liquid microlens.

Referring to FIG. 1A, a liquid microlens 10 is shown. The microlens 10 includes a small droplet 12 of a transparent liquid, such as water, typically (but not necessarily) with a diameter from several micrometers to several millimeters. The droplet 12 is disposed on a transparent substrate 14. The substrate is typically hydrophobic or includes a hydrophobic coating. The liquid and substrate need only be transparent to light waves having a wavelength within a selected range. Light waves are illustrated by reference numeral 16. Light waves pass through liquid microlens 10 and focus at a focal point or focal spot (designated by reference numeral 18) in a focal plane that is a focal distance "f" from the contact plane between droplet 12 and substrate 14.

The contact angle "θ" between the droplet 12 and the substrate 14 is determined by interfacial tensions "γ", generally measured in milli-Newtons per meter (mN/m). As used herein, $\gamma_{S-V}$ is the interfacial tension between the substrate and the air, gas or other liquid that surrounds the substrate 14, $\gamma_{L-V}$ is the interfacial tension between the droplet 12 and the air, gas or other liquid that surrounds the droplet 12, and $\gamma_{S-L}$ is the interfacial tension between the substrate 14 and the droplet 12. The contact angle θ may be determined from equation (1):

$$\cos\theta = \frac{\gamma_{S-V}\gamma_{S-L}}{\gamma_{L-V}} \quad \text{Equation (1)}$$

The radius "R" in meters of the surface curvature of droplet 12 is determined by the contact angle θ and the droplet volume in cubic meters ($m^3$) according to equation (2) as follows:

$$R^3 = \frac{3\text{ Volume}}{\pi(1-\cos\theta)(2-\cos^2\theta-\cos\theta)} \quad \text{Equation (2)}$$

The focal length in meters is a function of the radius R and the refractive indices "n", where $n_{Liquid}$ is the refractive index of the droplet 12 and $n_{Vapor}$ is the refractive index of the air, gas or other liquid that surrounds the droplet 12. The focal length f may be determined from equation (3):

$$f = \frac{R}{n_{Liquid} - n_{Vapor}} \qquad \text{Equation (3)}$$

The refractive index of the substrate is not important because of the parallel entry and exit planes for the light waves. The focal length of the microlens 10, therefore, is a function of the contact angle θ.

Figure 1B:
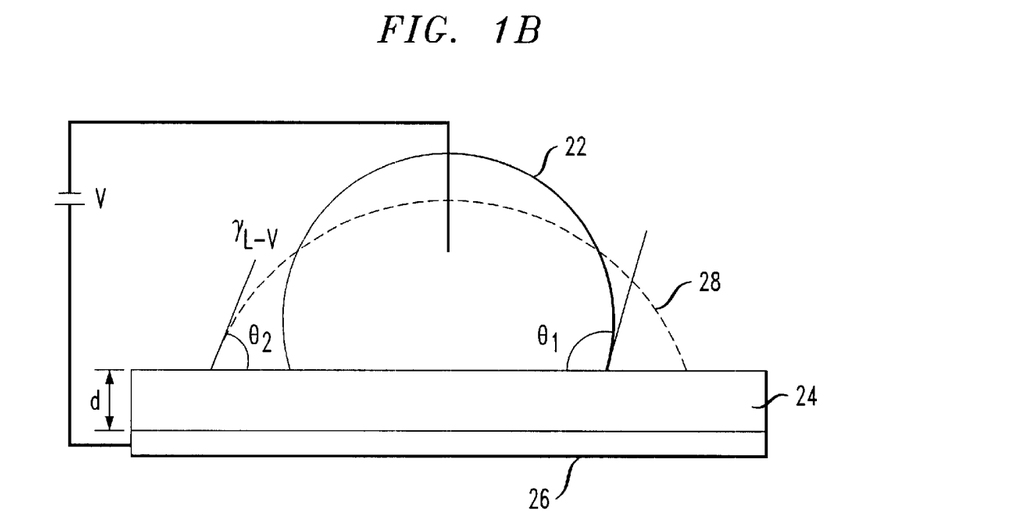
FIG. 1B is a diagrammatic representation of the electrowetting phenomena.

FIG. 1B demonstrates that the phenomena of electrowetting may be used to reversibly change the contact angle θ between a droplet 22 of a conducting liquid (which may or may not be transparent) and a dielectric insulating layer 24 having a thickness designated as "d" and a dielectric constant $\in_r$. An electrode, such as metal electrode 26, is positioned below the dielectric layer 24 and is insulated from the droplet 22 by layer 24. The droplet 22 may be, for example, a water droplet, and the substrate 24 may be, for example, a Teflon/Parylene surface.

When no voltage difference is present between the droplet 22 and the electrode 26, the droplet 22 maintains a shape defined by the volume of the droplet 22 and contact angle $\theta_1$, where $\theta_1$ is determined by the interfacial tensions γ as explained above. The dashed line 28 illustrates that the the droplet 22 spreads equally across layer 24 from its central position relative to electrode 26 when a voltage is applied between electrode 26 and droplet 22. The voltage may range from several volts to several hundred volts. Specifically, the contact angle θ decreases from $\theta_1$ to $\theta_2$ when the voltage is applied, regardless of polarity, between electrode 26 and the droplet 22. The amount of spreading, i.e., as determined by the difference between $\theta_1$ to $\theta_2$, is a function of the applied voltage V. The contact angle $\theta_2$ can be determined from equation (4):

$$\cos\theta(V) = \cos\theta(V=0) + \frac{\varepsilon_0 \varepsilon_r}{2d\gamma_{L-V}} V^2, \qquad \text{Equation (4)}$$

where cos θ (V=0) is the contact angle between the insulating layer 24 and the droplet 22 when no voltage is applied between the droplet 22 and electrode 26, $\gamma_{L-V}$ is the droplet interfacial tension described above, $\in_r$ is the dielectric constant of the insulating layer, and $\in_0$ is $8.85 \times 10^{-12}$ F/m—the permittivity of a vacuum.

Figure 2A:
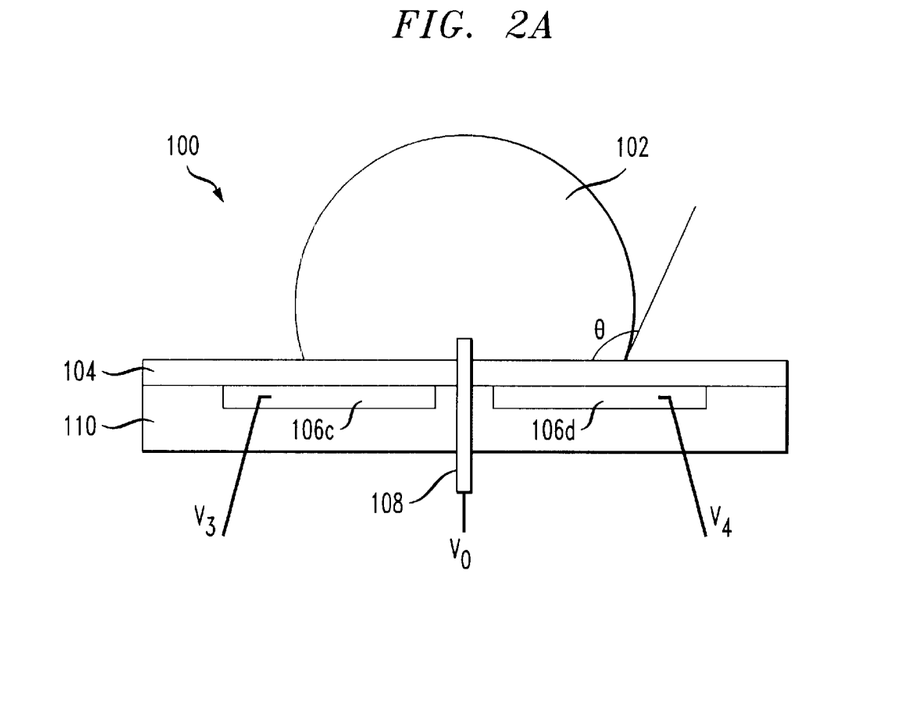
FIG. 2A is a diagrammatic representation of a tunable liquid microlens of the present invention.
Figure 2B:
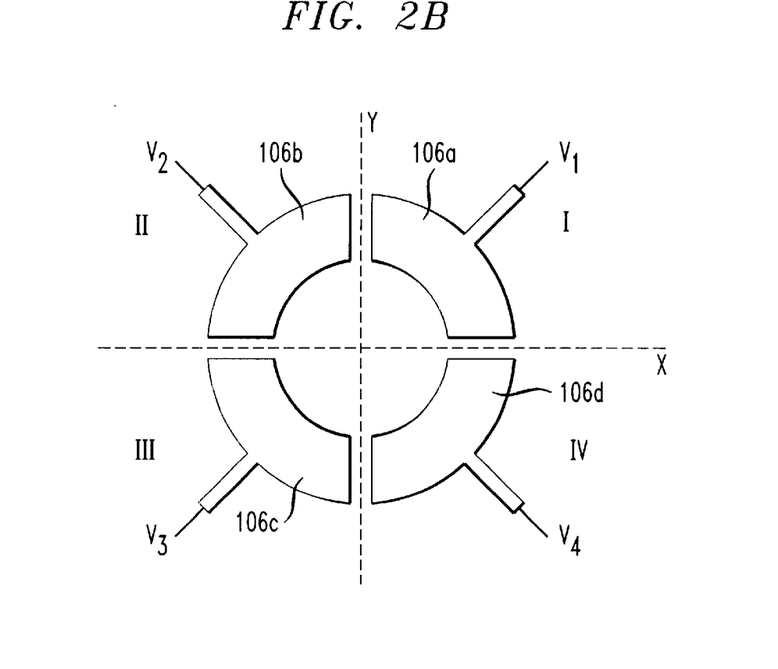
FIG. 2B illustrates one exemplary electrode pattern for a tunable liquid microlens of the present invention.

FIGS. 2A and 2B illustrate a tunable liquid microlens that is capable of varying both position and focal length as described hereafter. Referring to FIG. 2A specifically, a tunable liquid microlens 100 includes a droplet 102 of a transparent, conductive liquid disposed on a first surface of a transparent, dielectric insulating layer 104. The insulating layer 104 may be, for example, a polyimide coated with a fluorinated polymer, such as a highly fluorinated hydrocarbon. In any case, the insulating layer 104 should provide predetermined values of contact angle and contact angle hysteresis and have a high dielectric breakdown strength that is appropriate for the applied voltages. The microlens 100 includes a plurality of electrodes 106a–106d insulated from the droplet 102 by insulating layer 104. The microlens 100 may also include a transparent supporting substrate 110 which supports the electrodes 106 and insulating layer 104. The electrodes 106 and the supporting substrate 110 may be, for example, gold and glass, respectively.

FIG. 2B is a top plan view of an exemplary configuration for the electrodes 106a–106d. Although one configuration of four electrodes 106a–106d is shown, other numbers, combinations and patterns of electrodes 106 may be utilized depending upon the desired level of control over the tuning of the microlens 100. Each electrode 106a–106d is coupled to a respective voltage $V_1$–$V_4$ and droplet 102, which is centered initially relative to the electrodes 106, is coupled to a droplet electrode 108, which is coupled to a voltage Vo.

Figure 2C:
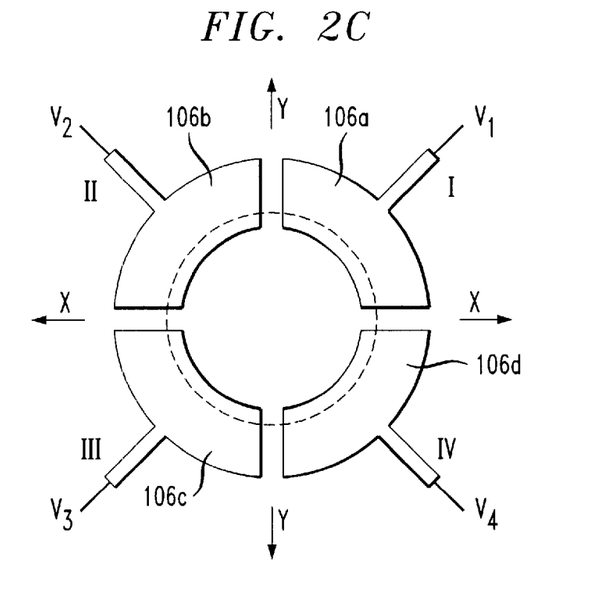
FIGS. 2C–2E illustrate the reaction of the tunable liquid microlens of the present invention to selected biasings of the electrodes of FIG. 2B.
Figure 2D:
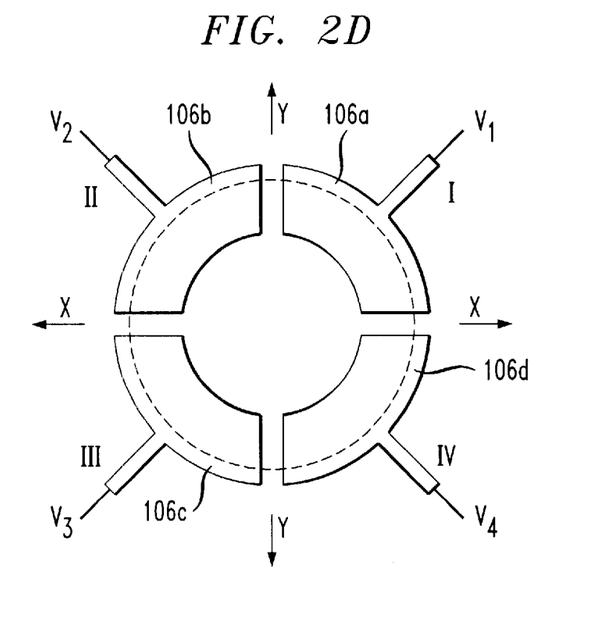

When there is no voltage difference between the droplet 102 and any of the electrodes 106 (i.e., $V_1=V_2=V_3=V_4=Vo$) and the droplet is centered relative to the electrodes 106 and quadrants I through IV, the droplet 102 assumes a shape as determined by contact angle θ and the volume of droplet 102 in accordance with equations (1)–(3) explained above. FIG. 2C illustrates this initial position of droplet 102 with a dashed line. The position of droplet 102 and the focal length of the microlens 100 can be adjusted by selectively applying a voltage potential between the droplet 102 and the electrodes 106. If equal voltages are applied to all four electrodes, i.e., $V_1=V_2=V_3=V_4 \neq Vo$, then the droplet 102 spreads equally within quadrants I, II, III, and IV (i.e., equally along lateral axes X and Y) as shown by the dashed line of FIG. 2D. In essence, the contact angle θ between the droplet 102 and insulating layer 104 decreases. In so doing, the focal length of the microlens 100 increases from the focal length of the microlens at the initial contact angle θ (i.e., when $V_1=V_2=V_3=V_4=Vo$).

Figure 2E:
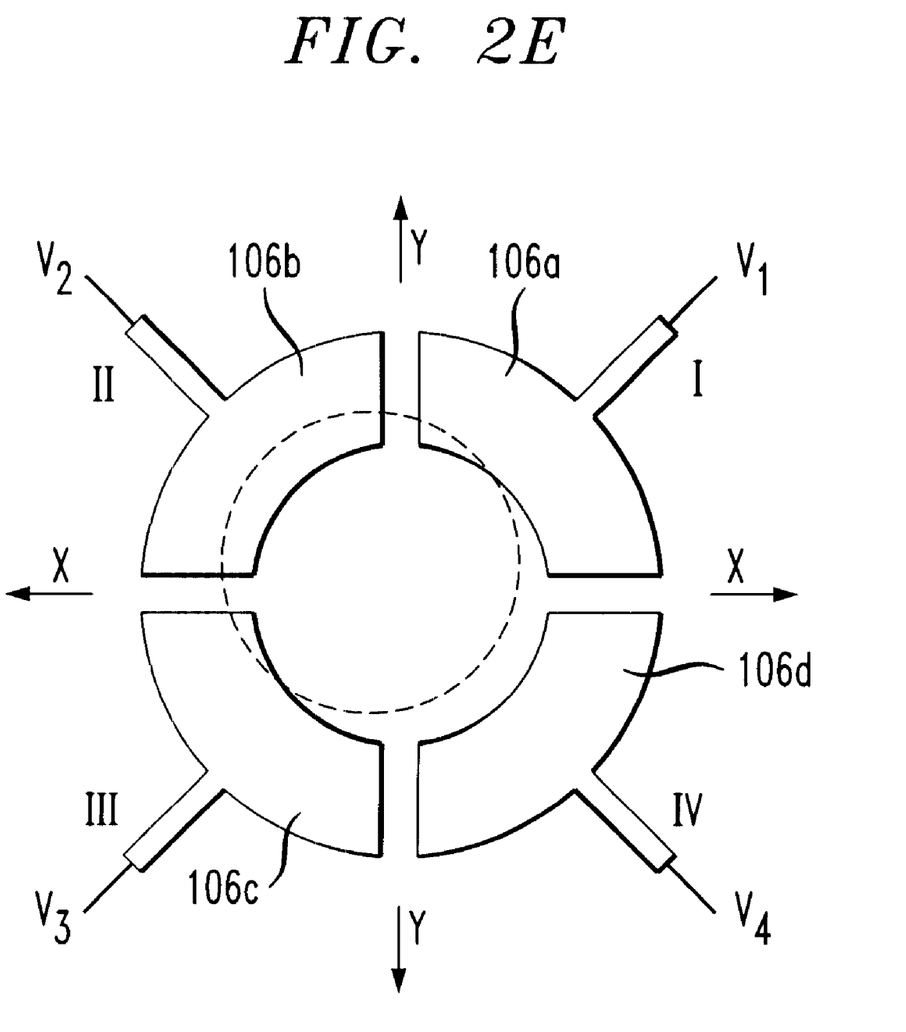

FIG. 2E illustrates that the lateral positioning of the droplet 102 along the X and Y axes can also be changed relative to the initial location of the droplet 102 on the first surface of insulating layer 104 by selectively biasing the electrodes 106 relative to droplet 102. For example, by making $V_1=V_3=Vo$ and by making $V_2$ greater than $V_4$, the droplet 102 is attracted toward the higher voltage of electrode 106b and moves toward quadrant II. By adjusting the lateral position of the droplet 102, the lateral position of the focal spot of the microlens in the focal plane is also adjusted.

It should be apparent from the above examples that the electrodes 106 can be selectively biased relative to the droplet electrode (and thus droplet 102) in any number of combinations in order to adjust the contact angle θ and thereby to modify the focal length of the microlens 100. Likewise, the electrodes 106 can be selectively biased in any number of combinations to reposition the droplet 102 relative to an initial location on the insulating layer 104, whereby the lateral position of the focal spot of the microlens is adjusted. Therefore, the microlens allows for the adjustment of the focal spot in three dimensions—the position of the focal spot as determined by the focal length and the lateral position of the focal spot in the focal plane that is parallel with the first surface of the microlens and is a focal length away from the microlens.

Figure 3A:
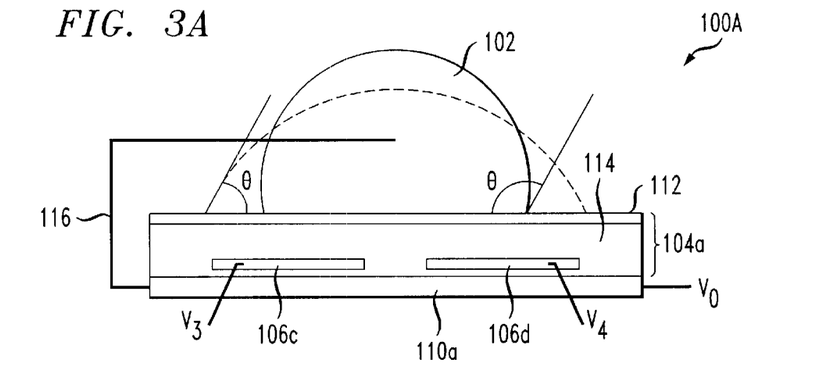
FIGS. 3A–C are diagrammatic representations of exemplary embodiments of a tunable liquid microlens according to the present invention.

FIG. 3A illustrates one manner of coupling the droplet 102 to a voltage Vo, such as ground or other constant voltage level. Microlens 100a may include a supporting substrate 110a which includes a conductive glass, such as indium tin oxide glass. The conductive glass is coupled to voltage Vo and an electrode 116 couples the substrate 110a to the droplet 102. The electrode 116 and supporting substrate 110a may collectively be considered a droplet electrode. FIG. 3A also illustrates that the insulating dielectric layer 104 may include a dielectric layer 114 and a hydrophobic coating layer 112. The coating layer 112 should provide a relatively high contact angle θ. One example is a highly fluorinated polymer, such as a Teflon or other material with chemical structure similar to Teflon. Low surface energy materials, such as silicon-containing polymers or molecules are also appropriate. In one embodiment, insulating layer 104a includes a coating layer 112 that is a Teflon film disposed on a polyimide dielectric layer 114.

Figure 3B:
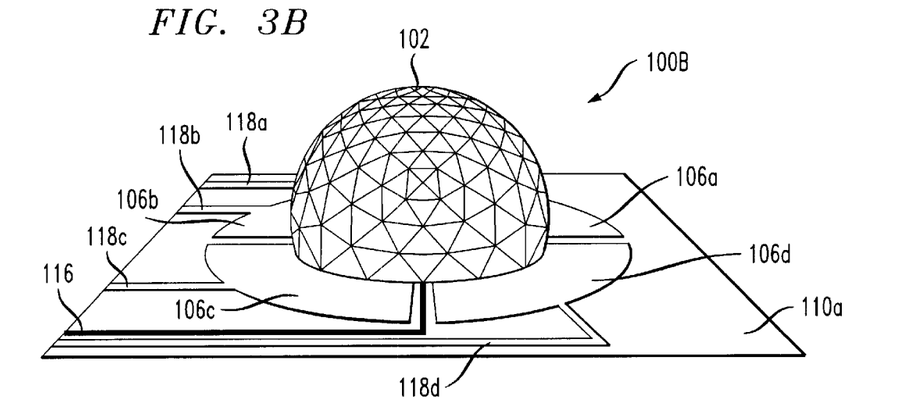

In an alternative embodiment of a microlens 100B shown in the isometric view of FIG. 3B, droplet electrode 116 may be, for example, a gold electrode evaporated or otherwise deposited on a first surface of an insulating layer 104 (not shown) in an area or plurality of areas that ensures that the electrode 116 maintains contact with the droplet 102 when the droplet 102 changes position along the first surface of the insulating layer 104. Although the electrode 116 is disposed to maintain in contact with the droplet 102 when the droplet 102 changes position, the droplet 102 is substantially disposed on the first surface of insulating layer 104. The microlens 100B may include a supporting substrate 110a that need not be conductive and may be, for example, non-conductive glass that serves as a mechanical support layer for insulating layer 104 and the electrodes 106. In that case, droplet electrode 116 may be coupled directly to a voltage Vo. Alternatively, the supporting layer 110a may be a conductive glass substrate that is coupled to a voltage Vo. In that embodiment, the droplet electrode 116 may be coupled to the supporting layer 110a. Also shown in FIG. 3B are electrodes 106a–106d and their respective power leads 118a–118d which are coupled to voltages $V_1$–$V_4$, respectively. Although an insulating layer 104 is not shown in FIG. 3B, this is for illustrative purposes only, and an insulating layer 104 insulates the droplet 102 and electrode 116 from electrodes 106a–106d.

Figure 3C:
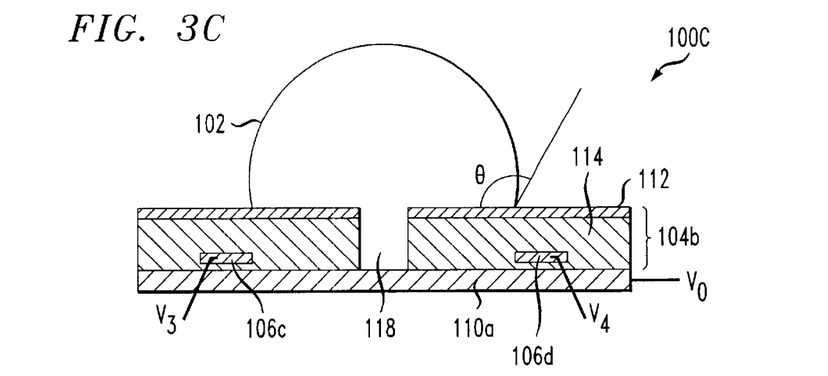

FIG. 3C illustrates an exemplary embodiment of a tunable liquid microlens 100C where no electrode 116 is required, thereby reducing any potential interference with the microlens from electrode 116. Microlens 100C includes droplet 102 disposed on a first surface of an insulating layer 104b. Microlens 100C also includes a transparent conductive supporting layer 110a which serves as a droplet electrode disposed along a second surface of insulating layer 104b opposite the first surface of insulating layer 104b. Microlens 100C is shown in cross-section to illustrate that insulating layer 104b includes an aperture 118 defined by the insulating layer 104b and continuing there through. The droplet 102 occupies at least a part of the aperture 118, thereby placing the droplet 102 in electrical communication with the droplet electrode, i.e., supporting substrate 110a. The supporting substrate 110a is then coupled to a voltage Vo. In this exemplary embodiment, the insulating layer 104b also does not have to be transparent as long as the aperture is wide enough so that the light that penetrates through the aperture is sufficient for the particular application.

The liquid droplet may be any liquid which is transparent to the desired wavelength and which is intrinsically conductive or which can be made conductive, such as through the use of various additive. Typical examples includes aqueous solutions of various salts. The electrodes may be any solid conductive materials, which may or may not be transparent, such as gold, aluminum, or indium tin oxide glass. The insulating layer may be any solid dielectric or a set of solid dielectrics that provide high enough dielectric strength and predefined values of contact angle and contact angle hysteresis. The insulating layer may or may not be transparent. Examples include solid polymers, such as polyimide and parylene. The supporting substrate may be any substrate that is transparent to a given wavelength, such as glass or a solid polymer. The applied voltages depend upon the selected materials, the layout of the microlens, and the desired change in the contact angle, as guided by the above equations (1)–(4). Typical voltages may vary between 0 volts and approximately 200 volts, although the acceptable voltages are not limited to this range.

In one embodiment, the liquid droplet of the microlens may be substantially encompassed by a liquid that is immiscible with the droplet. The surrounding liquid may help to prevent the microlens droplet from evaporating. When the droplet is waterbased, various oils or high molecular weight alcohols (e.g., pentanol, octanol, etc.) may be used.

The microlens 100C of FIG. 3C was tested. The microlens included a droplet 102 including 20 $\mu$l of 0.01 aqueous $KNO_3$ solution. The insulating layer 104b included a 3 $\mu$m thick polyimide layer coated with a very thin ($\approx$0.02 $\mu$m) layer of a highly fluorinated polymer that provided an initial contact angle of approximately 109°. A set of four gold electrodes 106 were arranged as shown in FIGS. 2B and 3C. The microlens included an ITO (indium tin oxide) glass plate as a conductive transparent supporting substrate 110a shown in FIG. 3C. Operating voltages between 0V and approximately 150V were applied.

A reversible adjustment of the focal length of the microlens within the range between 6 mm and 8 mm was demonstrated. Also, an adjustment of a microlens position within a range of about 3 mm in any lateral direction along the surface of the insulating layer was demonstrated. It should be understood that the obtained results do not represent the limits of the microlens, but rather serve to indicate that a tunable liquid microlens may be fabricated which can vary both focal distance length and focal spot position.

From the above, it should be apparent that the described microlens may be designed to have a desired contact angle θ when there is no voltage difference between the droplet and the electrodes 106 and a desired contact angle hysteresis. This may be achieved by selecting appropriate materials, dimensions, and volumes as guided by the equations set forth above. The microlens therefore allows substantial freedom in both droplet curvature and position control, thereby leading to a wide range of tunability in the microlens, focal length, focal spot position, and numerical aperture.

Figure 4:
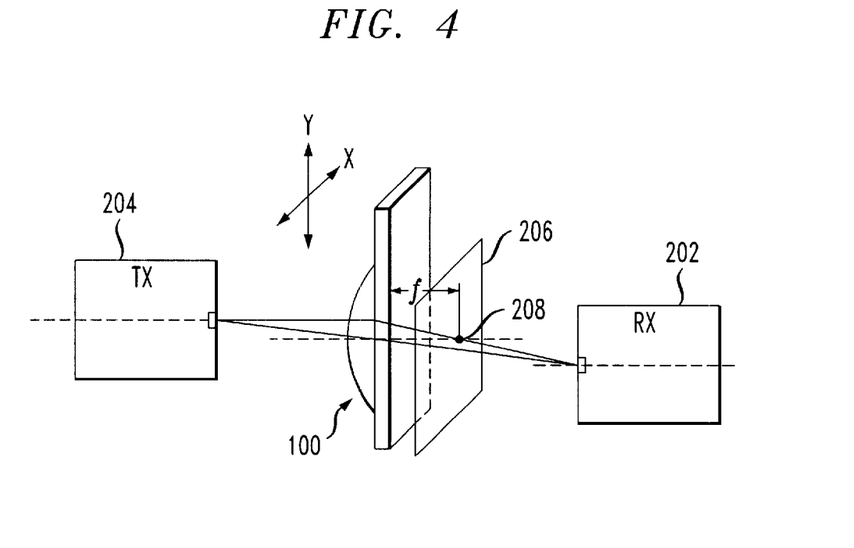
FIG. 4 illustrates an optical system including a tunable liquid microlens of the present invention.

One of ordinary skill should realize that the microlens of the present invention may be utilized in several optoelectronic applications. For example, the microlens may be used to achieve optimal coupling between an optical signal transmitter 204, such as a laser, and an optical signal receiver 202, such as a photodetector. This is illustrated in FIG. 4. It should be understood from FIG. 4 that the optical signal from transmitter 204 is diverging and will be focused behind the focal plane 206. The lens focal distance and lateral positioning of the focal spot 208 within focal plane 206 of the microlens 100 may be adjusted as described above by selectively biasing the plurality of electrodes 106 to achieve this optimal coupling. The biasing electrodes can be selectively biased until the highest power is detected at receiver 202—representing the optimal coupling between transmitter 204 and receiver 202. Currently, optoelectronic packages, i.e., physical apparatuses incorporating optoelectronic components such as lasers and or photodetectors, are calibrated by physically moving component parts to achieve optimal coupling. This process can be slow and quite expensive. By including at least one microlens of the present invention in the apparatus, the need to physically align component parts to achieve optimal coupling is eliminated. Rather, the focal length and lateral position of the focal spot of the microlens of the present invention may be adjusted to redirect an optical signal from a transmitter to a fixed receiver.

Figure 5:
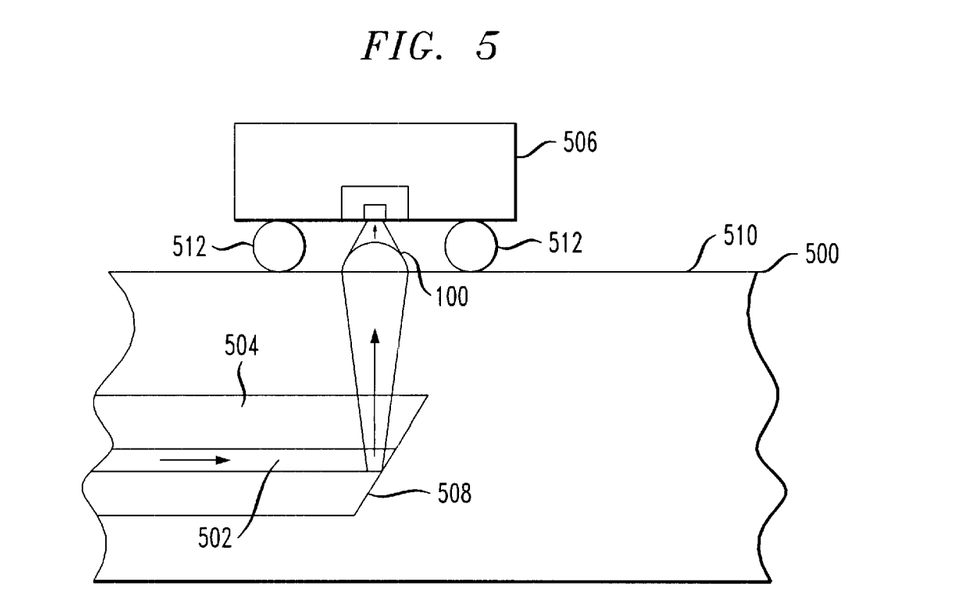
FIG. 5 is a diagram of an apparatus including a planar waveguide and a tunable liquid microlens of the present invention.

In another exemplary application illustrated in FIG. 5, a microlens 100, or plurality of microlenses of the present invention, is utilized to couple an optoelectronic component, such as a photodetector 506 that is surface mounted through a ball grid array 512 on a printed circuit board 500, with an embedded planar waveguide 504. Light propagates through a core 502 of planar waveguide 504 as indicated by the directional arrows. The light is reflected by a mirror edge 508 towards a top surface 510 of the printed circuit board 500. A tunable liquid microlens 100 is disposed on the top surface 510 of the printed circuit board 500 and directs the light 502 toward photodetector 506 in the direction shown. The electrodes of the tunable liquid microlens 100 may be selectively biased to adjust the focal length and lateral focal spot position of the microlens 100 in order to tune the microlens 100 to optimize the transmission of the light from the planar waveguide 504 to the photodetector 506. The shape of the microlens is maintained by the application of the appropriate voltage.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A tunable liquid microlens, comprising:

an insulating layer;

a droplet of a transparent conducting liquid disposed on a first surface of said insulating layer; and a plurality of electrodes insulated from said droplet by said insulating layer, said plurality of electrodes being disposed such that they may be selectively biased to create a respective voltage potential between said droplet and each of said plurality of electrodes, whereby a contact angle between said droplet and said first surface is variable and said droplet may be repositioned along said first surface.

2. The tunable liquid microlens of claim 1, further comprising a droplet electrode for biasing said droplet with respect to said plurality of electrodes.

3. The tunable liquid microlens of claim 2, wherein said droplet electrode includes a conductive transparent substrate disposed along a second surface of said insulating layer, said second surface being opposite said first surface, said insulating layer defining an aperture through said insulating layer whereby said droplet at least partly occupies said aperture and is in electrical communication with said droplet electrode.

4. The tunable liquid microlens of claim 3, wherein said transparent substrate comprises a conductive glass.

5. The tunable liquid microlens of claim 3, wherein said plurality of electrodes are disposed within said insulating layer, said plurality of electrodes being insulated from said droplet electrode.

6. The tunable liquid microlens of claim 2, wherein said droplet electrode comprises a conductive lead affixed to said first surface of said insulating layer and contacting said droplet.

7. The tunable liquid microlens of claim 6, wherein said droplet electrode includes a conductive transparent substrate disposed along a second surface of said insulating layer, said second surface being opposite said first surface, said conductive lead coupling said droplet to said conductive transparent substrate.

8. The tunable liquid microlens of claim 1, further comprising a transparent supporting substrate disposed along a second surface of said insulating layer, said second surface being opposite said first surface.

9. The tunable liquid microlens of claim 1, wherein said insulating layer is a substantially planar substrate characterized by a relatively high dielectric strength.

10. The tunable liquid microlens of claim 1, wherein said droplet is substantially encompassed by a liquid that is immiscible with said droplet, said liquid protecting said droplet from evaporation.

11. A method of tuning a liquid microlens, said liquid microlens including a droplet of a transparent conducting liquid disposed on a first surface of an insulating layer, comprising the steps of:

selectively biasing a plurality of electrodes insulated from said droplet by said insulating layer to create a respective voltage potential between said droplet and each of said plurality of electrodes.

12. The method of claim 11, wherein said step of selectively biasing includes the step of selectively biasing said plurality of electrodes to vary a contact angle between said droplet and said first surface.

13. The method of claim 11, wherein said step of selectively biasing includes the step of selectively biasing said plurality of electrodes to reposition said droplet along said first surface.

14. The method of claim 11, wherein said step of selectively biasing includes the steps of selectively biasing said plurality of electrodes to vary a contact angle between said droplet and said first surface and to reposition said droplet along said first surface.

15. An apparatus, including:

a transmitter, said transmitter providing an optical signal;

a receiver, said receiver receiving said optical signal; and a tunable liquid microlens disposed to direct said optical signal from said transmitter to said receiver, said tunable liquid microlens comprising:

an insulating layer;

a droplet of a transparent conducting liquid disposed on a first surface of said insulating layer; and a plurality of electrodes insulated from said droplet by said insulating layer, said plurality of electrodes being disposed such that they may be selectively biased to create a respective voltage potential between said droplet and each of said plurality of electrodes, whereby a contact angle between said droplet and said first surface is variable and said droplet may be repositioned along said first surface, whereby a focal length and a lateral position of a focal spot of said microlens are adjusted to direct said optical signal from said transmitter to said receiver.

16. The apparatus of claim 15, further comprising a droplet electrode for biasing said droplet with respect to said plurality of electrodes.

17. The apparatus of claim 16, wherein said droplet electrode includes a conductive transparent substrate disposed along a second surface of said insulating layer, said second surface being opposite said first surface, said insulating layer defining an aperture through said insulating layer whereby said droplet at least partly occupies said aperture and is in electrical communication with said droplet electrode.

18. The apparatus of claim 17, wherein said transparent substrate comprises a conductive glass.

19. The apparatus of claim 17, wherein said plurality of electrodes are disposed within said insulating layer, said plurality of electrodes being insulated from said droplet electrode.

20. The apparatus of claim 16, wherein said droplet electrode comprises a conductive lead affixed to said first surface and contacting said droplet.

21. The apparatus of claim 20, wherein said droplet electrode includes a conductive transparent substrate disposed along a second surface of said insulating layer, said second surface being opposite said first surface, said conductive lead coupling said droplet to said conductive transparent substrate.

22. The apparatus of claim 15, further comprising a transparent supporting substrate disposed along a second surface of said insulating layer, said second surface being opposite said first surface.

23. The apparatus of claim 15, wherein said insulating layer is a substantially planar substrate characterized by a relatively high dielectric strength.

24. A method of transmitting an optical signal, comprising the steps of:

directing said optical signal from a first location towards a liquid microlens, said liquid microlens including a droplet of a transparent conducting liquid disposed on a first surface of an insulating layer; and tuning said liquid microlens to redirect said optical signal, said tuning step comprising the steps of:

selectively biasing a plurality of electrodes insulated from said droplet by said insulating layer to create a respective voltage potential between said droplet and each of said plurality of electrodes.

25. The method of claim 24, wherein said step of selectively biasing includes the step of selectively biasing said plurality of electrodes to vary a contact angle between said droplet and said first surface, whereby a focal length of said liquid microlens is adjusted.

26. The method of claim 24, wherein said step of selectively biasing includes the step of selectively biasing said plurality of electrodes to reposition said droplet along said first surface, whereby a lateral position of a focal spot of said liquid microlens is adjusted.

27. The method of claim 24, wherein said step of selectively biasing includes the the following steps:

selectively biasing said plurality of electrodes to vary a contact angle between said droplet and said first surface, whereby a focal length of said tunable liquid microlens is adjusted, and selectively biasing said plurality of electrodes to reposition said droplet along said first surface, whereby a lateral position of a focal spot of said liquid microlens is adjusted.

28. A tunable liquid microlens, comprising:

means for insulating;

transparent fluidic conducting means disposed on a first surface of said insulating means; and means for varying a contact angle between said transparent fluidic conducting means and said first surface and for repositioning said transparent fluidic conducting means along said first surface.

29. The tunable liquid microlens of claim 28, wherein said transparent fluidic conducting means is substantially encompassed by a fluidic protecting means immiscible with said transparent fluidic conducting means for protecting said droplet from evaporation.

* * * * *